(12) United States Patent
Dzik (10) Patent No.: US 9,087,508 B1
(45) Date of Patent: Jul. 21, 2015

(54) PRESENTING REPRESENTATIVE CONTENT PORTIONS DURING CONTENT NAVIGATION

(71) Applicant: Audible, Inc., Newark, NJ (US)

(72) Inventor: Steven Charles Dzik, Somerset, NJ (US)

(73) Assignee: Audible, Inc., Newark, NJ (US)

( * ) Notice: Subject to any disclaimer, the term of this patent is extended or adjusted under 35 U.S.C. 154(b) by 244 days.

(21) Appl. No.: 13/655,284

(22) Filed: Oct. 18, 2012

(51) Int. Cl.
G10L 13/00 (2006.01)
G10L 21/00 (2013.01)
G10L 21/057 (2013.01)

(52) U.S. Cl.
CPC ............... *G10L 13/00* (2013.01); *G10L 21/057* (2013.01)

(58) Field of Classification Search
CPC .............................. G10L 13/00; G10L 21/057
See application file for complete search history.

(56) References Cited

U.S. PATENT DOCUMENTS

| | | | |
|---|---|---|---|
| 5,189,326 A * | 2/1993 | Barrow | 360/63 |
| 6,185,527 B1 * | 2/2001 | Petkovic et al. | 704/231 |
| 6,356,922 B1 | 3/2002 | Schilit et al. | |
| 7,068,723 B2 * | 6/2006 | Foote et al. | 375/240.25 |
| 7,263,530 B2 * | 8/2007 | Hu et al. | 1/1 |
| 7,912,723 B2 * | 3/2011 | Qu | 704/270 |
| 8,131,545 B1 | 3/2012 | Moreno et al. | |
| 8,214,209 B2 * | 7/2012 | Nagatomo | 704/235 |
| 8,583,439 B1 * | 11/2013 | Kondziela | 704/267 |
| 8,799,755 B2 * | 8/2014 | Krause | 715/200 |
| 8,855,797 B2 | 10/2014 | Story, Jr. et al. | |
| 2002/0007349 A1 | 1/2002 | Yuen | |
| 2003/0061028 A1 | 3/2003 | Dey et al. | |
| 2003/0115289 A1 | 6/2003 | Chinn et al. | |
| 2003/0158735 A1 * | 8/2003 | Yamada et al. | 704/260 |
| 2004/0261093 A1 | 12/2004 | Rebaud et al. | |
| 2007/0061487 A1 | 3/2007 | Moore et al. | |
| 2007/0136459 A1 | 6/2007 | Roche et al. | |
| 2008/0046406 A1 * | 2/2008 | Seide et al. | 707/3 |

(Continued)

FOREIGN PATENT DOCUMENTS

| | | |
|---|---|---|
| JP | 2002-328949 | 11/2002 |
| JP | 2003-304511 | 10/2003 |

(Continued)

OTHER PUBLICATIONS

Halvey, Martin et al., "An Assessment of Tag Presentation Techniques", World Wide Web Conference Committee, May 8, 2007, available at http://www2007.org/htmlposters/poster988/.

(Continued)

*Primary Examiner* — Brian Albertalli
(74) *Attorney, Agent, or Firm* — Knobbe, Martens, Olson & Bear, LLP (57) ABSTRACT

Systems and methods are provided for causing aural and/or visual presentation of representative content in response to a request to progress or navigate through audio content at a scan rate exceeding a threshold playback rate. In some embodiments, a current position marker in the audio content may be repeatedly updated based on the scan rate. For each updated position of the current position marker, one or more characteristic words associated with the content near the current position marker may be determined. A continuous presentation of the determined characteristic words may be generated and presented aurally and/or visually in order to provide an indication as to the subject matter of the content at the current position.

23 Claims, 7 Drawing Sheets

(56) References Cited

U.S. PATENT DOCUMENTS

| | | | |
|---|---|---|---|
| 2008/0243510 A1* | 10/2008 | Smith | 704/259 |
| 2008/0294453 A1 | 11/2008 | Baird-Smith et al. | |
| 2008/0300872 A1* | 12/2008 | Basu et al. | 704/235 |
| 2009/0063974 A1* | 3/2009 | Bull et al. | 715/716 |
| 2009/0066722 A1* | 3/2009 | Kriger et al. | 345/619 |
| 2009/0204399 A1* | 8/2009 | Akamine | 704/235 |
| 2009/0228570 A1 | 9/2009 | Janik et al. | |
| 2009/0233705 A1 | 9/2009 | Lemay et al. | |
| 2010/0042682 A1 | 2/2010 | Kaye | |
| 2010/0070575 A1 | 3/2010 | Bergquist et al. | |
| 2010/0286979 A1 | 11/2010 | Zangvil et al. | |
| 2010/0287256 A1 | 11/2010 | Neilio | |
| 2011/0067082 A1 | 3/2011 | Walker | |
| 2011/0087802 A1 | 4/2011 | Witriol et al. | |
| 2011/0154199 A1* | 6/2011 | Maffitt et al. | 715/716 |
| 2011/0161085 A1* | 6/2011 | Boda et al. | 704/260 |
| 2011/0231474 A1 | 9/2011 | Locker et al. | |
| 2012/0030288 A1 | 2/2012 | Burckart et al. | |
| 2012/0150935 A1 | 6/2012 | Frick et al. | |
| 2012/0166180 A1 | 6/2012 | Au | |
| 2012/0197998 A1 | 8/2012 | Kessel et al. | |
| 2012/0246343 A1 | 9/2012 | Story, Jr. et al. | |
| 2014/0039887 A1 | 2/2014 | Dzik et al. | |
| 2014/0223272 A1 | 8/2014 | Arora et al. | |
| 2014/0250219 A1 | 9/2014 | Hwang | |

FOREIGN PATENT DOCUMENTS

| | | |
|---|---|---|
| JP | 2004-029324 | 1/2004 |
| JP | 2004-117618 | 4/2004 |
| JP | 2004-266576 | 9/2004 |
| JP | 2007-522591 | 8/2007 |
| JP | 2007-249703 | 9/2007 |
| JP | 2010-250023 | 11/2010 |
| NZ | 532174 | 1/2007 |

OTHER PUBLICATIONS

Enhanced Editions, Aug. 31, 2009, p. 1.
Roub, Paul, "I'll Buy an E-book Reader When . . . ", Nov. 16, 2007, available at: http://roub.net/blahg/2007/11/16/ill-buy-an-eboo/ (accessed: Sep. 6, 2012), 2 pages.
U.S. Appl. No. 12/273,473, filed Nov. 18, 2008.
Yardena Arar, E-Book Platform, Jan. 7, 2010.

* cited by examiner

PRESENTING REPRESENTATIVE CONTENT PORTIONS DURING CONTENT NAVIGATION

BACKGROUND

Generally described, computing devices may present various types of digital content to users for consumption. For example, computing devices may visually present items of content such as electronic books, movies, television programs and other multi-media content. Similarly, computing devices may aurally present content such as audio books, music, movies, and other multi-media content. When an individual selects to navigate through content at an accelerated pace, such as fast-forwarding or rewinding through audio content, existing systems often present the content in a modified form from which it may be difficult for the individual to determine what is included in the content. For example, a user may be able to select to fast-forward through audio at a "2×" scan rate, where the audio content is played back at twice the normal speed. While a listener may be able to understand the audio content at such a speed, the audio content may become difficult or impossible to comprehend if the user selects a 4× or 8× scan rate.

In some systems, during accelerated content navigation like fast-forwarding or rewinding, portions of the content may be skipped at a constant interval (such as skipping ahead in increments of one second, five seconds, thirty seconds, etc.) and brief snippets of content that occur at these positions may be played for the user. In some such systems, the user may be able to understand one or two words of the audio content in each snippet, but the words may be prepositions, pronouns or other words that do not give the listener much information regarding the subject matter of the content at the given position. Accordingly, while attempting to find a portion of interest in the content while rewinding or fast-forwarding, the listener may find himself repeatedly stopping the rewind or fast-forward operation to listen to the content for some time at normal speed in order to have a sense of the subject matter of the content at the given point.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure are directed to presenting words audibly and/or visually that provide a user with an idea as to the subject matter of a portion of content through which the user has selected to navigate at an accelerated rate, such as during a fast-forward or rewind operation. In this regard, a content navigation service is disclosed that presents, during accelerated navigation of content, selected words from the content that are determined to be characteristic or representative of the content near a current position marker. As the current position marker is updated in accordance with the navigation request (such as a fast-forward or rewind request), the content navigation service may continually determine words characteristic of the content near the current position marker, and cause visual and/or aural presentation of the determined words. Accordingly, the user may be presented with a continuous stream of words extracted from the content that provides the user with an idea as to what is included in the content through which the user has selected to navigate. In some embodiments, the user may be able to ascertain the subject matter of the content even at very high scan rates, such as a fast-forward operation that scans minutes of audio content in a few seconds. The user may determine from the presented words that he has reached a point in the content at which he would like to consume at a normal pace. The user may then select to stop the accelerated navigation and play the content beginning at the current position marker.

In some embodiments, the characteristic words for given portions of audio content (such as audio content of an audio book) may be determined based at least in part on a corresponding or related item of textual content (such as textual content of an electronic book version of the same underlying book). An item of textual content and a corresponding item of audio content are sometimes referred to herein as "companion" content. An item of audio content and a corresponding item of companion textual content may be synchronized with one another. For example, a computing device implementing the content navigation service may be provided with content synchronization information that maps one or more words in the item of companion textual content with a position of an identical word or words in the item of audio content (e.g., the identical word or words that are spoken, sung, recited, etc. in the item of audio content). More information regarding synchronizing an item of audio content with an item of companion textual content, as well as content synchronization information that may be stored in association with the synchronization, may be found in U.S. patent application Ser. No. 12/273,473 ("the '473 application"), filed Nov. 18, 2008, entitled "SYNCHRONIZATION OF DIGITAL CONTENT," which is hereby incorporated by reference in its entirety.

In one embodiment, a content navigation module (when executed by one or more processors) as disclosed herein may cause a computing device to play at least a portion of audio content of an audio book, where the audio content is associated with companion textual content that includes text of the words spoken in the audio content. During playback of the audio content by the computing device, the content navigation module may receive a user selection indicating a request to scan the audio content, where the request to scan the audio content corresponds to a fast-forward request or a rewind request. The request to scan the audio content may be associated with a particular scan rate. The content navigation module may then determine whether the scan rate exceeds a predetermined threshold rate. If the scan rate exceeds the threshold rate, the content navigation module may define a content window within the audio content that includes at least a portion of content near a current progress position in the audio book. The content navigation module may then determine one or more characteristic words associated with the content window. The one or more characteristic words may be determined based at least in part by comparing, for each of a plurality of words in a portion of the electronic book corresponding to the portion of the audio content included in the content window, a frequency of the word in the portion of the electronic book corresponding to the content window with a frequency of the word in the electronic book as a whole. The content navigation module may then cause the computing device to aurally present one or more portions of the audio content that correspond to the one or more characteristic words associated with the content window. In some embodiments, the content navigation module may continuously adjust the content window in the direction of the scan request based at least in part on the scan rate, and cause the computing device to continuously present portions of the audio content corresponding to characteristic words determined for the continuously adjusted content window.

A content navigation service as disclosed herein may be implemented in any of a number of environments in which content is presented. In one embodiment, the content navigation service may be implemented as an application executed on a user computing device configured to present visual and/or audio content. A user interface to navigate the content may be provided on the user computing device as the application is executed. In another embodiment, the content navigation service may be implemented through a content page hosted by a content navigation server on a network. The content page may be accessed by a user computing device via a network resource browser. A user interface for navigating the content may be provided on the content page, and the content may be streamed from the content navigation server to the user computing device for presentation thereon. Other implementations are possible in different embodiments.

While reference is frequently made herein to presenting an item of audio content that is synchronized to an item of companion textual content, the presented content to be navigated may include any type of content that is presented continuously over time. Examples of continuously-presented content may include audio books, musical works, electronic books, television programs, video clips, movies, multimedia content, video games, and other types of content. Likewise, the companion textual content may include any type of digital textual content that is a companion to the item of continuously-presented content, such as an electronic book, screenplay, script, libretto, transcription (e.g., speech-to-text) or other textual content.

Figure 1:
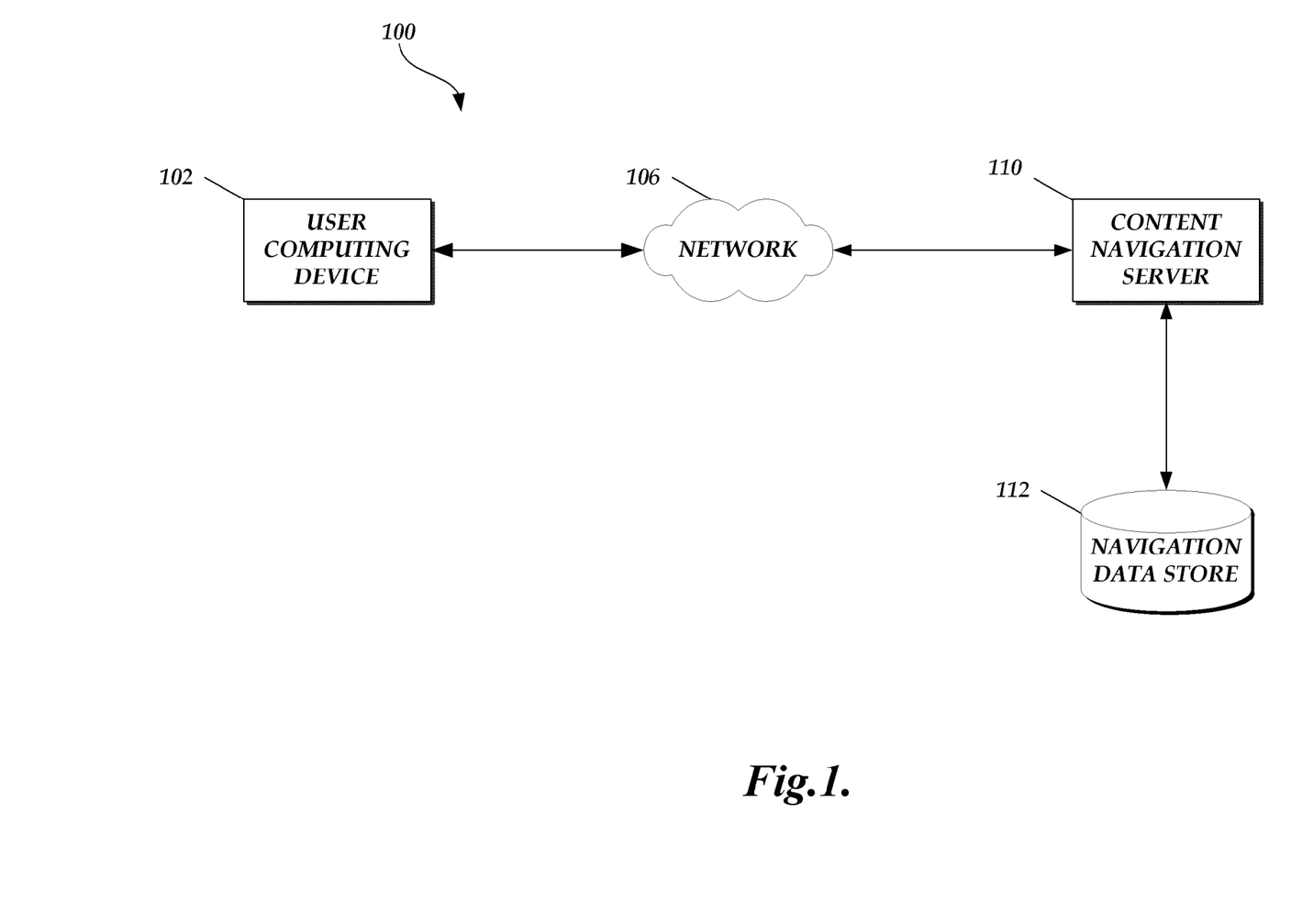
FIG. 1 is a schematic block diagram depicting an illustrative network environment for implementing a content navigation service.

Turning to FIG. 1, an illustrative network environment 100 is shown in which a content navigation service is implemented. The network environment 100 may include a user computing device 102, a network 106, a content navigation server 110, and a navigation data store 112. The constituents of the network environment 100 may be in communication with each other either locally or over the network 106.

The user computing device 102 may be any computing device capable of communicating over the network 106, such as a laptop or tablet computer, personal computer, personal digital assistant (PDA), hybrid PDA/mobile phone, mobile phone, global positioning system (GPS) device, electronic book reader, set-top box, camera, audio book player, digital media player, video game console, in-store kiosk, television, one or more processors, integrated components for inclusion in computing devices, appliances, electronic devices for inclusion in vehicles or machinery, gaming devices, or the like.

The user computing device 102 may generally be capable of presenting audio and/or visual content to a user of the user computing device 102. For example, the user computing device 102 may be capable of playing audio content by directing audible or aural output through speakers, headphones, or the like. The user computing device 102 may also be capable of presenting images, video content, text, and user interfaces on a display screen. The user computing device 102 may further be capable of receiving user input through a user input device, such as a keyboard, mouse, touchpad, trackball, touchscreen, gamepad, microphone, or other input device known in the art.

The user computing device 102 may further be capable of accessing network resources, such as content pages, via the network 106. For example, the user computing device 102 may be provided with a network resource browser capable of displaying content pages provided by the content navigation server 110 via the network 106. Continuously-presented content may be presented through these content pages on the user computing device 102, e.g., by streaming audio content from the content navigation server 110 over the network 106 to the user computing device 102.

In some embodiments, the user computing device 102 also stores one or more items of audio content and/or companion textual content in an electronic data store. For example, the user computing device 102 may include one or more hard disk drives, solid state memories, and/or any other type of non-transitory computer readable storage medium accessible to or integrated within the user computing device 102. These items may be retrieved from storage and conveyed by the user computing device 102. The user computing device 102 may also store content synchronization information in the electronic data store. As discussed above, content synchronization information may map one or more words in an item of companion textual content with a presentation position of an identical or substantially similar word or words in an item of audio content.

The network 106 may be any wired network, wireless network, or combination thereof. In addition, the network 106 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The content navigation server 110 is a computing device that may perform a variety of operations to implement a content navigation service. For example, the content navigation server may synchronize an item of audio content with an item of companion textual content. In some embodiments, the item of companion textual content may be a textual representation of the item of audio content that was transcribed therefrom. The content navigation server 110 may provide items of audio content and/or companion textual content to the user computing device 102. In some embodiments, the content navigation server 110 may present an item of audio content and/or visual content to the user computing device 102 for presentation. Additional operations of the content navigation server 110 are described below with respect to FIG. 2.

The content navigation server 110 may be in communication with a navigation data store 112. The navigation data store 112 may electronically store items of audio content and/or companion textual content, such as audio books, musical works, electronic books, television programs, video clips, movies, multimedia content, video games, and other types of content. The navigation data store 112 may additionally store, in some embodiments, word frequency data that associates words within a given content item with data regarding each word's frequency within the content item, as further discussed below. The navigation data store 112 may be embodied in hard disk drives, solid state memories, and/or any other type of non-transitory computer-readable storage medium accessible to the content navigation server 110. The navigation data store 112 may also be distributed or partitioned across multiple local and/or storage devices as is known in the art without departing from the spirit and scope of the present disclosure. In yet other embodiments, the navigation data store 112 may be a data storage web service.

The user computing device 102 and content navigation server 110 may each be embodied in a plurality of devices. A server or other computing system implementing the user computing device 102 and/or content navigation server 110 may include a network interface, memory, processing unit, and non-transitory computer-readable medium drive, all of which may communicate with each other by way of a communication bus. Moreover, a processing unit may itself be referred to as a computing device. The network interface may provide connectivity over the network 106 and/or other networks or computer systems. The processing unit may communicate to and from memory containing program instructions that the processing unit executes in order to operate the user computing device 102 and content navigation server 110. The memory generally includes RAM, ROM, and/or other persistent and/or auxiliary non-transitory computer-readable storage media.

It will be recognized that many of the devices described above are optional and that embodiments of the environment 100 may or may not combine devices. Furthermore, devices need not be distinct or discrete. Devices may also be reorganized in the environment 100. For example, the content navigation server 110 may be represented in a single physical server or, alternatively, may be split into multiple physical servers. In other embodiments, the entire content navigation service may be represented in a single computing device, such as user computing device 102.

Additionally, in some embodiments, the content navigation service is implemented by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 2:
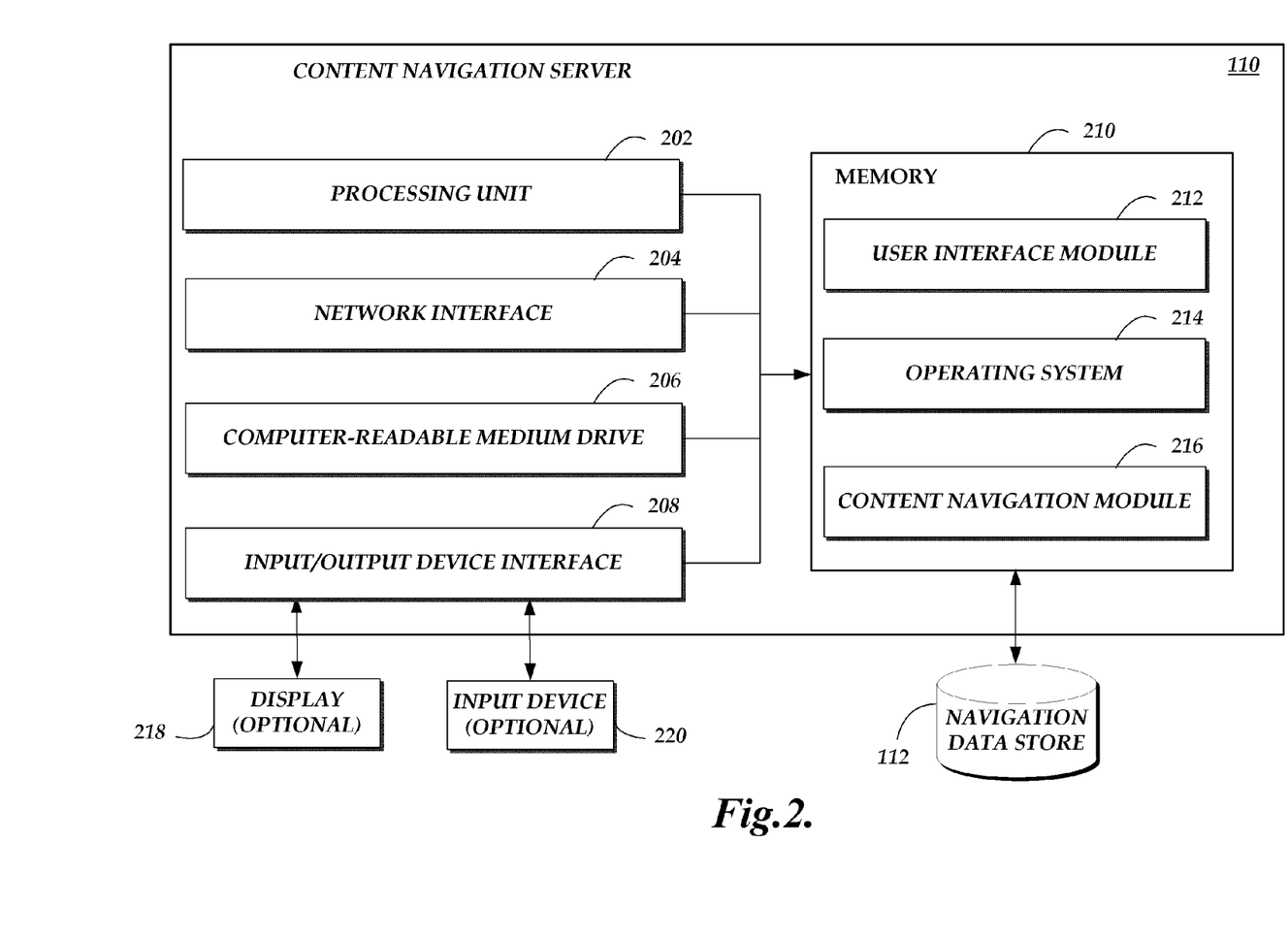
FIG. 2 is a schematic block diagram depicting an illustrative content navigation server of the network environment depicted in FIG. 1.

FIG. 2 is a schematic diagram of the content navigation server 110 shown in FIG. 1. The content navigation server 110 includes an arrangement of computer hardware and software components that may be used to implement the content navigation service. FIG. 2 depicts a general architecture of the content navigation server 110 illustrated in FIG. 1. Those skilled in the art will appreciate that the content navigation server 110 may include more (or fewer) components than those shown in FIG. 2. It is not necessary, however, that all of these generally conventional components be shown in order to provide an enabling disclosure.

The content navigation server 110 includes a processing unit 202, a network interface 204, a non-transitory computer-readable medium drive 206, and an input/output device interface 208, all of which may communicate with one another by way of a communication bus. As illustrated, the content navigation server 110 is optionally associated with, or in communication with, a display 218 and an input device 220. The display 218 and input device 220 may be used in embodiments in which users interact directly with the content navigation server 110, such as an integrated in-store kiosk or integrated component for inclusion in an automobile, boat, train, or airplane, for example. In other embodiments, the display 218 and input device 220 may be included in the user computing device 102 shown in FIG. 1. The network interface 204 may provide content navigation server 110 with connectivity to one or more networks or computing systems. The processing unit 202 may thus receive information and instructions from other computing systems (such as the user computing device 102) or services via a network. The processing unit 202 may also communicate to and from memory 210 and further provide output information for an optional display 218 via the input/output device interface 208. The input/output device interface 208 may accept input from the optional input device 220, such as a keyboard, mouse, digital pen, touch screen, or gestures recorded via motion capture. The input/output device interface 220 may also output audio data to speakers or headphones (not shown).

The memory 210 contains computer program instructions that the processing unit 202 executes in order to implement one or more embodiments of the content navigation service. The memory 210 generally includes RAM, ROM and/or other persistent, auxiliary or non-transitory computer-readable storage media. The memory 210 may store an operating system 214 that provides computer program instructions for use by the processing unit 202 in the general administration and operation of the content navigation server 110. The memory 210 may further include other information for implementing aspects of the content navigation service. For example, in one embodiment, the memory 210 includes a user interface module 212 that facilitates generation of user interfaces (such as by providing instructions therefor) for display upon a computing device, such as the user computing device 102. For example, a user interface may be displayed via a navigation interface such as a web browser implemented by the user computing device 102. In addition, the memory 210 may include or communicate with the navigation data store 112. Content stored in the navigation data store 112 may include various types of content items (e.g., audiobooks, electronic books, music, movies, multimedia works, text documents, etc.), word frequency data and/or content synchronization information.

In addition to the user interface module 212, the memory 210 may include a content navigation module 216 that may be executed by the processing unit 202. In one embodiment, the content navigation module 216 may implement various aspects of the present disclosure. For example, the content navigation module 216 may present audio content and/or companion content, receive user requests to navigate content, determine characteristic words for given portions of content, present content associated with characteristic words during content navigation, and other aspects of the disclosure described herein.

While in the illustrated embodiment, the content navigation service is implemented by the content navigation server 110, in other embodiments, the content navigation service may be implemented partially or entirely by the user computing device 102. For example, the content navigation service may be provided as specialized application software and/or hardware on the user computing device 102. Accordingly, the user computing device 102 may include a content navigation module 216 and other components that operate similarly to the components illustrated as part of the content navigation server 110, including a processing unit 202, network interface 204, non-transitory computer-readable medium drive 206, input/output interface 208, memory 210, user interface module 212, and so forth.

Figure 3:
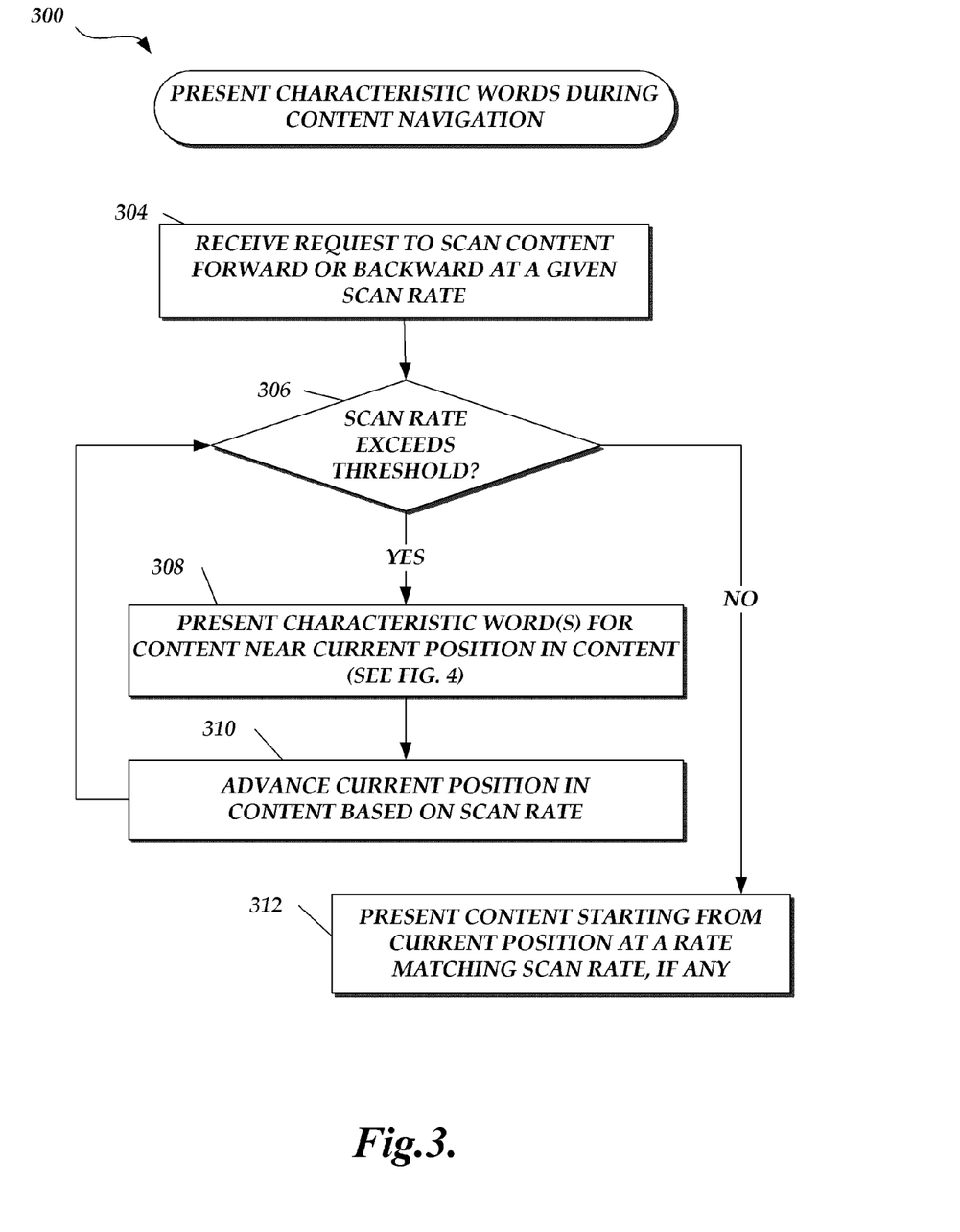
FIG. 3 is flow diagram depicting an illustrative method for presenting characteristic words of given portions of content during content navigation.

FIG. 3 is flow diagram depicting an illustrative method 300 implemented by the content navigation module 216 for presenting characteristic words for given portions of content during content navigation. As discussed above, in some embodiments, the content navigation server 110 may include the content navigation module 216. In other embodiments, the user computing device 102 may include the content navigation module 216, and may implement illustrative method 300 without any content navigation server being needed. While illustrative methods 300 and 400 will be described below with reference to an embodiment in which the content being navigated is audio content, it will be appreciated that content other than audio content may be navigated in a similar manner.

Illustrative method 300 begins at block 304, where the content navigation module 216 receives a request to scan either forward or backward through content at a given scan rate. For example, the request may be received via one or more user interface controls presented to a user during playback of audio content, as discussed in more detail below with reference to FIG. 6. The request to scan the audio content may correspond, for example, to a request to rewind or fast-forward through the audio content. The scan rate may be determined in a variety of ways, depending on the embodiment. For example, a fast-forward or rewind operation may have one or more predetermined rates or speeds from which the user may select a rate. The rate may be increased based on the number of times that the user selects a fast-forward or rewind option, such that a user may select a fast-forward button or option once to progress forward through the content at a first speed (such as a 2× scan rate), twice to progress forward through the content at a second speed (such as a 4× scan rate), and so on. Alternatively, the rate may correspond to a speed at which a user selects to move a graphical position indicator along a timeline that represents the audible and/or visual playback of the content. As will be appreciated, the scan request and corresponding scan rate may be determined based on any of a number of other known methods for selecting to rewind, fast-forward, seek, scan, scrub or otherwise navigate within digital content.

In some embodiments, the scan rate may be defined relative to a normal playback rate (such as 2×, 4×, 6×, 8×, 16×, and similar multiples of a normal 1× playback rate). In other embodiments, the scan rate may be defined with reference to an interval length, where the content navigation module 216 progresses a current playback position marker through the content at a certain interval (such as skipping or jumping through the content in 5 second intervals, 10 second intervals, 30 second intervals, one minute intervals, etc.) In still other embodiments, the scan rate may be defined as a given amount of scan time that the content navigation module 216 should take to progress through a given amount of audio content. As an example, the scan request may be associated with a request to present thirty minutes of audio content in twenty seconds.

At block 306, the content navigation module 216 determines whether the scan rate exceeds a threshold rate. The threshold rate may be a rate above which the content navigation module 216 has been configured to no longer present content in its full form. For example, the threshold rate may be a predetermined rate that corresponds to a playback rate or speed at which spoken word audio content can no longer be understood by a typical listener, and/or at which the audio content playback is not audibly pleasing. In the illustrated embodiment, if the content navigation module 216 determines that the scan rate exceeds the threshold, the illustrative method proceeds to block 308, discussed below. If the content navigation module 216 instead determines that the scan rate does not exceed the threshold, the illustrative method proceeds to block 312, where the content navigation module 216 presents the content starting from the current playback position at a playback rate matching the given scan rate. In some embodiments, the content navigation module 216 may adjust the pitch of the audio content presented at block 312. For example, if the audio content is conveyed at a faster rate, the pitch of the audio content may be lowered. If the audio content is conveyed at a slower rate, the pitch of the audio content may be raised. In some embodiments other than that illustrated in FIG. 3, the content navigation module 216 may proceed to block 308 without checking whether the scan rate exceeds a threshold, such that block 306 may not be implemented in every embodiment.

At block 308, the content navigation module 216 aurally and/or visually presents one or more characteristic words for the audio content near the current position in the audio content. Determining and presenting the characteristic words are described below with reference to FIG. 4. Generally described, the characteristic words may be one or more words that the content navigation module 216 determines are characteristic or representative of the content within a given content window near the current playback position in the content. The content window may be, in one embodiment, a portion of the audio content beginning at the current playback position that is of a length determined based at least in part on the scan rate, as further discussed below. The content navigation module 216 may select the characteristic words for the given window of content in a variety of ways, as will be further discussed with reference to FIG. 4.

After or contemporaneously with the presentation of the characteristic words for the content near the current playback position, the content navigation module 216 may advance the current position in the content based on the scan rate, at block 310. Advancing the current position may include updating the position of a visual position marker or indicator within a generated user interface, such as a position of a marker on a displayed timeline representing the audio content or a section of the audio content (such as an act, movement, verse, scene, chapter, etc.). In some embodiments, during content scanning, the content navigation module 216 advances the current position at set times, such as advancing the current position once each second, once each two seconds, or once during some other time period. The amount that the navigation module 216 advances the current position each time that the position is advanced may be determined based on the scan rate. For example, if the content navigation module 216 advances the current position once each second, and the scan rate is an 8× scan rate (indicating that the content should be scanned at eight times the normal playback rate), the content navigation module 216 may advance the current position eight seconds within the stored audio content each time that the current position is updated.

Each time that the content navigation module 216 advances the current position within the content, the illustrative method returns to block 306 to determine whether the scan rate still exceeds the threshold (prior to presenting characteristic words for content near the newly updated current position at block 308). If the scan rate continues to exceed the threshold, the method 300 may continue to aurally and/or visually generate a continuous presentation of characteristic words while the current playback position continues forward or backward at the given scan rate.

The scan rate may no longer exceed the threshold, for example, if a user has selected to slow down the scan rate or to resume playback at a normal playback rate or speed. The user may select such an option, for example, when the user has determined from the presented characteristic words that the current playback position includes subject matter in which the user is interested. In such a case, the method proceeds to block 312, where the content navigation module 216 resumes playback or presentation of the content at a normal playback rate, beginning at the current position. In some embodiments, prior to beginning presentation at a normal playback rate, the content navigation module 216 may adjust the current playback position in the opposite direction of the scan in order to account for a typical reaction time of a user (such that the scan does not result in the playback skipping the content portion of potential interest to the user). As another example, the scan rate may no longer exceed the threshold at block 306 if the current position has reached the end of the content or a section of the content (such as an act, movement, verse, scene, chapter, etc.), in which case the method may proceed to begin playback of the content at the start of the next section, if any.

Figure 4:
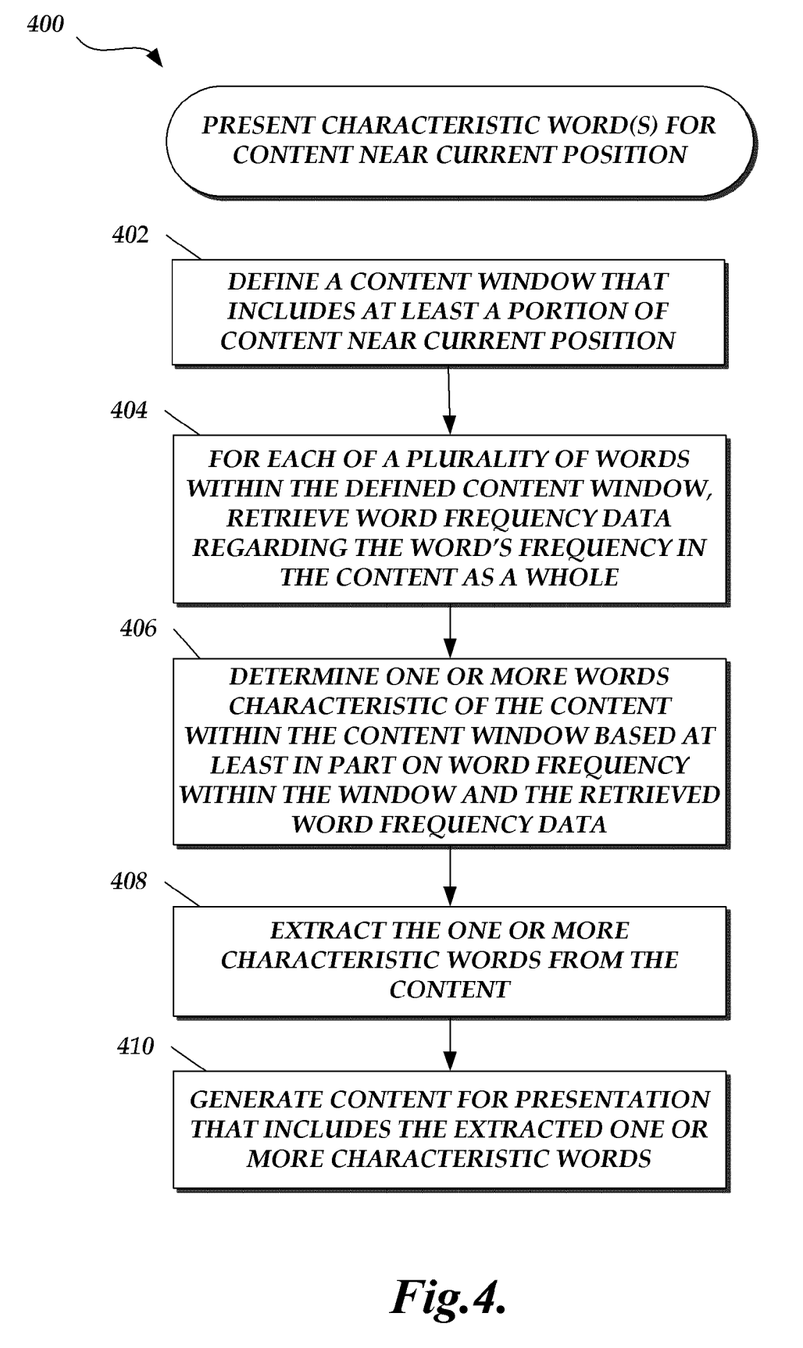
FIG. 4 is flow diagram depicting an illustrative method for presenting characteristic words for content near a current playback position in the content.

FIG. 4 is flow diagram depicting an illustrative method 400 for presenting characteristic words for content near a current playback position in the content while the content is being scanned (such as in response to a user request to rewind of fast-forward through the content). Illustrative method 400 may be implemented by the content navigation module 216, for example, at block 308 of method 300 described above.

The illustrative method 400 begins at block 402, where the content navigation module 216 defines boundaries of a content window that includes at least a portion of content near the current playback position in the content. For example, the content may be stored audio content, and the current playback position may be a given time marker or byte location within the stored audio content. In some embodiments, the size of the content window (or the amount of content included between a start and end position of the content window) may be determined based on the scan rate. For example, the amount of content included in the content window may be greater for a fast scan rate than for a relatively slower scan rate. In this manner, the content window may be large enough to include sufficient content from which to select characteristic or representative words near a given position, prior to updating the current position and the location of the content window based on the scan rate. In one embodiment, the size of the content window may be equal to an interval length by which the current position is progressed during content scanning. For example, if the current position in the audio content is advanced by thirty seconds once per second, the content window may be defined to include thirty seconds of the audio content. In other embodiments, the size of the content window may be less than or greater than the size of the intervals by which the current position is advanced.

The content window may be defined by a start position and end position, where the start and end position may each be defined by a time marker in the audio content, a word in corresponding companion text content, a byte offset within the audio content or companion text content, or any other means of identifying a specific location within content. In some embodiments, the current position in the audio content may define one boundary of the content window, with the other boundary determined as a certain amount of time, certain number of words, or certain number of bytes from the current position in the direction of the scan request (which may be either forward or backward in the content). In other embodiments, the window may be defined to include the current position as the middle of the content window or otherwise within the defined window. In still other embodiments, the content window may begin a certain number of words, length of time, or number of bytes ahead of or behind the current position based at least in part on the scan rate.

Once the content navigation module 216 has defined the content window, the illustrative method proceeds to block 404. At block 404, for each of at least a subset of the words included in the content within the defined content window, the content navigation module 216 retrieves word frequency data. In embodiments in which the content being scanned is audio content, the content navigation module 216 may first determine the words included in the content window based on companion text content or known speech-to-text methods (not illustrated). For instance, in some embodiments, portions of companion items of content may be synchronized through the use of reference points that map portions of one companion item of content to corresponding portions of another companion item of content. In a specific example, a segment of text (e.g., a word, line, sentence, etc.) may be mapped to a timestamp of a corresponding audio recording. Example methods for synchronizing an item of textual content with a companion item of audio content are disclosed in the '473 application, which is incorporated herein by reference above. Accordingly, in some embodiments, the words corresponding to spoken or narrated content within the content window may be determined based on retrieved synchronization information that synchronizes the audio content with companion text content.

As discussed in more detail with reference to FIG. 5 below, the word frequency data retrieved at block 404 may be retrieved from a mapping table that maps each of a number of words appearing in the content item (such as an audio book and/or electronic book) with each word's frequency in the content item. The frequency data for each word may include an indication of the number of times that the word appears in the content as a whole, and/or the number of times that the word appears within each section of the content (such as each chapter of a book). In other embodiments, the frequency data may indicate a general rank or score regarding the frequency of the word in the content, with or without indicating the number of times that the word appears in the content. In some embodiments, the retrieved data may indicate each word's frequency in common usage outside of the given book or other content item, as will be further described below. In some embodiments, the word frequency data is only retrieved for words that match certain criteria and/or that satisfy initial screening criteria. For example, the content navigation module 216 may not consider certain common words as potential characteristic words, such as "and," "the," prepositions, pronouns, etc. The common words may be determined, for example, as a list of the one hundred or one thousand most common words in the language in which the content item was written or recorded At block 406, the content navigation module 216 determines one or more characteristic words for the content within the defined content window based at least in part on the retrieved word frequency data. The content navigation module 216 may generally select words as characteristic words based on a determination that the words appear more frequently in the given content window than they appear in the content as a whole and/or in common usage outside of the given content item (such as in common English usage, or common usage of the language of the content item). As one example, if electronic book content corresponding to the given content window includes the word "Halloween" twice, and the word "Halloween" is indicated in the word frequency data as only appearing in the entire electronic book three times, the content navigation module 216 may select "Halloween" as a characteristic word for the content window. This determination may be made, for example, because aural or visual presentation of the word "Halloween" to a user in this case may be likely to give the user a good indication of distinctive subject matter of the content within the content window relative to the content of the electronic book as a whole. In contrast, if the word frequency data indicates that the word "Halloween" appears a large number of times throughout the content as a whole, or within a current section of the content outside of the current content window, the content navigation module 216 may not select "Halloween" as a characteristic word for the content window.

In some embodiments, the content navigation module 216 may determine the one or more characteristic words for the content within the content window in part by analyzing the audio content itself. For example, the content navigation module 216 may analyze volume, tone, pitch and/or one or more other characteristics of the audio to identify portions or words that are outliers from the surrounding content. For example, such audio analysis may identify a word that a narrator spoke loudly or emphasized. In some embodiments, in determining characteristic words, the content navigation module 216 may consider previous user actions relative to the content within the content window. For example, the content navigation module 216 may consider whether any users have previously bookmarked, highlighted or made a note regarding a given word, phrase or content portion within the content window. In some embodiments, the content navigation module 216 may additionally consider metadata previously stored at the direction of a human editor and/or a method previously implemented by the content navigation server 110 indicating certain words that are likely to be good candidates for being selected as characteristic words. In some embodiments, the content navigation module 216 may determine a word score or phrase score for each word or phrase based on one or more of the criteria mentioned above for determining a characteristic word. The content navigation module 216 may then select a certain number of words and/or phrases having the highest score in order to select the characteristic word(s) for the given content window.

Once the content navigation module 216 has determined the one or more characteristic words for the content in the given content window, the content navigation module 216 extracts the one or more characteristic words from the content, at block 408. For example, the content navigation module 216 may use content synchronization data to determine time markers or byte locations in the audio content (such as previously recorded narration audio data) at which each characteristic word is spoken. In other embodiments, the content navigation module 216 may generate audio data corresponding to the characteristic words from text content, such as by employing a text-to-speech converter.

Lastly, at block 410, the content navigation module 216 generates content for presentation that includes the characteristic word(s) extracted or generated at block 408. The presentation may include aurally presenting the words, such as by playing the extracted audio data from an audio book or other audio content. The presentation may alternatively or additionally include a visual presentation of the text of the characteristic words. In some embodiments, generating the content for presentation may include splicing, blending, overlapping or otherwise combining the extracted audio data, such as extracted audio data for two or more non-adjoining words in the audio content. The content navigation module 216 may present different characteristic words in a different manner depending on how high a score was determined for the given word or how representative of the given window of content each word was determined to be. For example, a visual presentation may display certain words in a larger font, in bold, in italic, in different colors, etc. Similarly, an aural presentation may play audio data for certain words louder, in a different pitch, etc.

Figure 5:
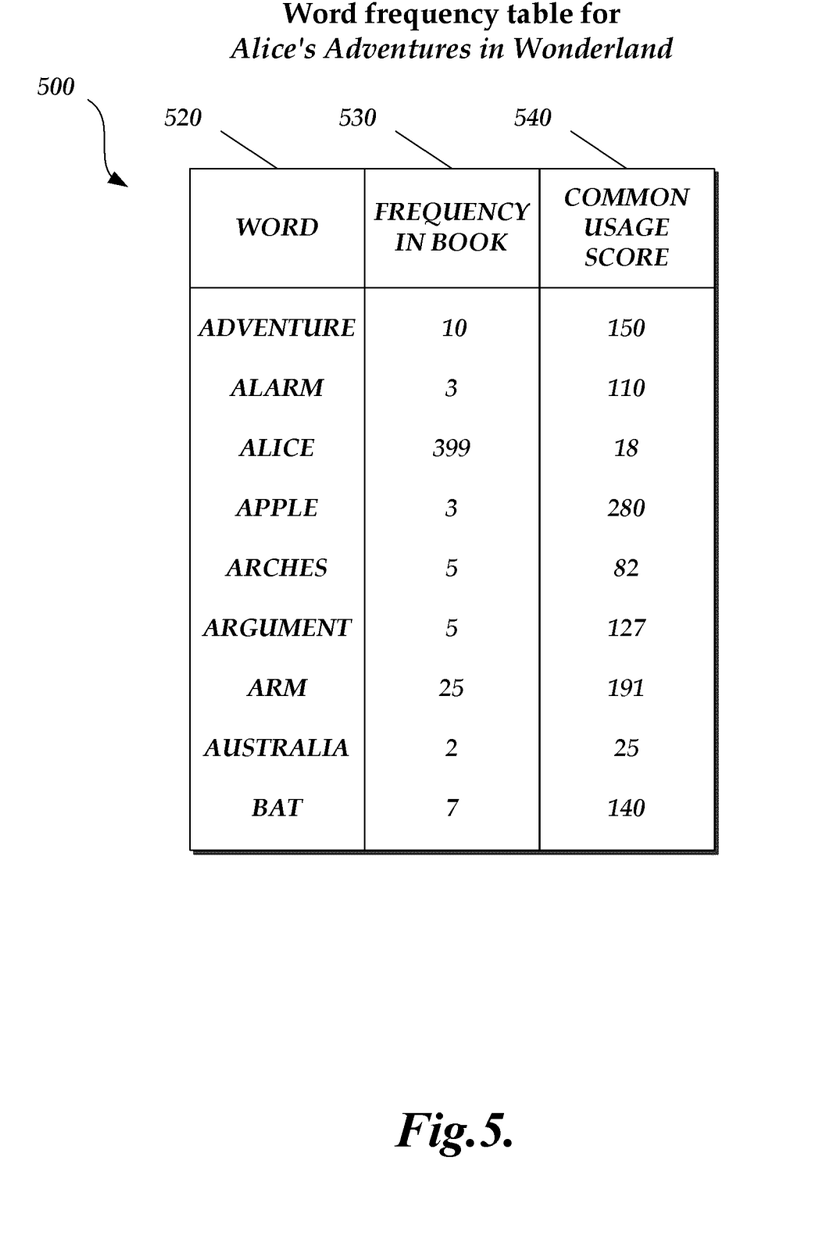
FIG. 5 is a table diagram depicting illustrative mappings of words to each word's frequency in a book, and to each word's frequency in common usage.

FIG. 5 is a table diagram 500 depicting illustrative mappings of words to each word's frequency in a book, and to each word's frequency in common usage (such as in general English usage without regard to the specific book). While a portion of a representative table 500 is illustrated for a book, *Alice's Adventures in Wonderland*, a similar table may be stored for a variety of content items other than books. As illustrated, the table 500 includes a list of words 520, where each word is associated with a frequency in the book 530 and a common usage score 540. In some embodiments, the table 500 may include an entry for every word that appears in the book or other content item. In other embodiments, the table 500 may only include words that appear a certain minimum number of times in the book. The table 500 may exclude words that have very high common usage scores (such as "a," "she," "the," etc.). In one embodiment, the word frequency table 500 may be generated based on an electronic book version of the book, and may be generated and stored in the narration data store 112 prior to the methods 300 and 400 (discussed above) being implemented. The content navigation module 216 may look up frequency data and common usage scores from the table 500 when presenting audio content and/or text content corresponding to one or more versions of the book.

The frequency in the book 530 for each word may be, for example, a count of the number of times that the given word appears in the book. In other embodiments, the frequency in the book 530 may be normalized based on the frequency of other words in the book, or may be a rank of how common the given word is in the book relative to other words in the book. The common usage score 540 may indicate how common the word is generally, without regard to the content of the given book. For example, a high common usage score may indicate that a word is relatively common in the English language (or other language of the book). The common usage score 540 for each word may be determined, for example, based on an analysis of word frequency across a large number of books and/or other content items. In some embodiments, a word frequency table similar to word frequency table 500 may not include a common usage score entry and/or may include one or more additional entries for each word. For example, a word frequency table may include, in some embodiments, an indication of a word's frequency within each of a number of sections of the content (such as each chapter, verse, act, etc.).

Figure 6:
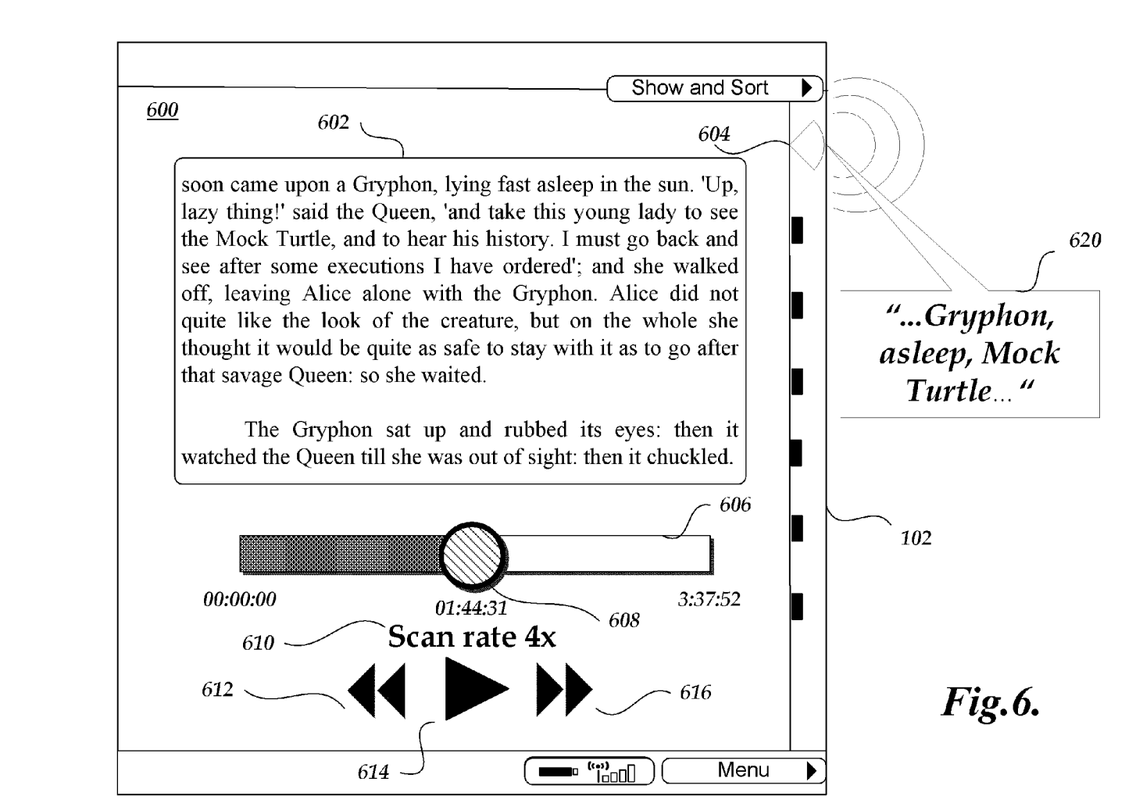
FIGS. 6 and 7 are pictorial diagrams that include illustrative user interfaces presented during content navigation, as well as representations of audio data corresponding to characteristic words determined for a current window of content.

FIG. 6 is a pictorial diagram that includes an illustrative user interface 600 presented during content navigation, as well as a representation of audio 620 corresponding to characteristic words determined for a current window of content. As illustrated, the user interface 600 is displayed on user computing device 102. The user interface may be generated at least in part by the user computing device 102 and/or the content navigation server 110, depending on the embodiment. As illustrated, user computing device 102 may aurally present audio 620 corresponding to characteristic words via one or more speakers 604 and/or one or more audio outputs, which may be provided to speakers or headphones. User interface 600 additionally includes a displayed portion of companion text content 602, which represents text of the spoken words of the audio data (such as an audio book)

starting at the current playback position. Text content 602 is shown for illustrative purposes only and may not be displayed in other embodiments.

The user interface 600 includes a progress bar 606 that represents the current playback position of the audio content by the location of a position indicator 608. In some embodiments, the position indicator 608 may be configured to be manipulated with respect to the progress bar 606, such as by dragging or sliding it across the progress bar 606. Manipulation of the position indicator, in some embodiments, may be considered a request to scan content at a scan rate corresponding to the drag or slide speed.

The user interface 600 may be presented, for example, after the user has selected to scan forward through the audio content at a 4× scan rate, as indicated by scan rate indicator 610. The scan request may have been received, for example, based on the user selecting fast-forward option 606. Similarly, the user could select rewind option 612 in order to scan backward through the content. As mentioned above, the user may indicate the desired scan rate in a number of ways. For example, the scan rate may be increased based on the number of times that the user selects the fast-forward option 616 or rewind option 612.

The audio 620 presented in the illustrated example includes three extracted portions of narrated audio content, which are the spoken words or phrases "Gryphon," "asleep," and "Mock Turtle." These portions have been combined and presented by the content navigation module 216 based on the content navigation module determining that these are characteristic or representative words or phrases for the content within a content window near the playback position represented by position indicator 608. The content window may include, for example, at least a portion of the content illustrated in text content 602. The characteristic words may have been selected, for example, based on the illustrative methods 300 and 400, discussed above. In the illustrated embodiment, the position indicator 608 may continue to progress forward at a rate corresponding to scan rate 610, and the content navigation module 216 may continuously present a stream of characteristic words as audio 620. The characteristic words may be determined based on a content window that is continuously updated in accordance with the progression of the position indicator 608. If the user would like to resume normal playback of the audio content, the user may select play option 614.

Figure 7:
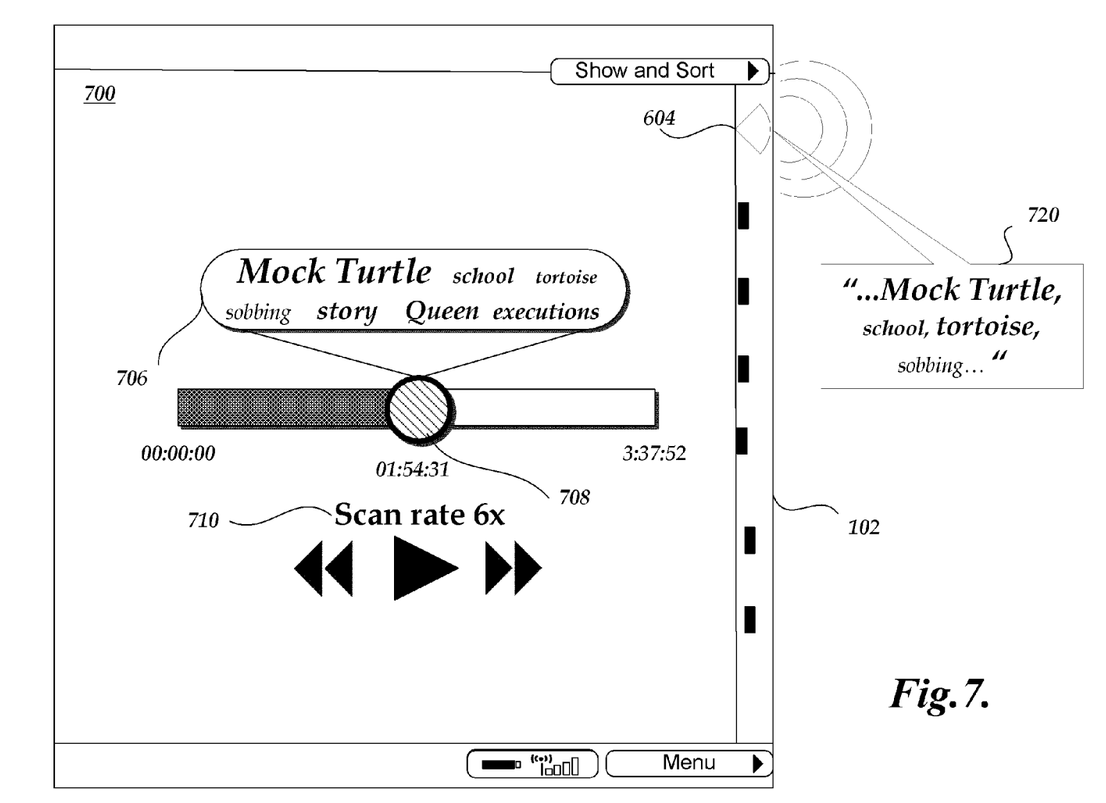

FIG. 7 is a pictorial diagram that includes an illustrative user interface 700 presented during content navigation, as well as a representation of characteristic audio 720 and characteristic text 706 determined for a current window of content. As illustrated, user interface 700 includes many elements similar to user interface 600 discussed above. As illustrated, the scan rate 710 is increased to a 6× scan rate, as opposed to the 4× scan rate of user interface 600. As illustrated, user interface 700 includes display of characteristic words 706 as text content. These characteristic words may have been determined based on one or more of the methods described above. The characteristic words 706 may include words that have been determined to be characteristic of content within one or more content windows near the position in the audio content represented by position indicator 708.

The size of the words in the displayed characteristic words 706 may indicate a relative word score or phrase score for each word or phrase based on one or more of the criteria mentioned above for determining characteristic words. For example, the text "Mock Turtle" may be displayed larger than the text "school" based on a determination by the content navigation module 216 that "Mock Turtle" appears more times in the given content window and/or is more characteristic of the content in the given content window. Similarly, audio data for the phrase "Mock Turtle" in audio 720 may be presented louder (or with some other volume, tone or pitch adjustment) than the audio data for the word "school." In other embodiments, the displayed characteristic words may be presented graphically in a number of different ways that represent the strength or frequency of the words in the content window based on font, color, size, etc. For example, in some embodiments, the content navigation module 216 may implement one or more techniques typically used in generating tag clouds, word clouds or weighted lists.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y, or Z, or a combination thereof. Thus, such conjunctive language is not generally intended to imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted or executed out of order from that shown or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for navigating content of an audio book, the system comprising:
   an electronic data store configured to store:
      an audio book; and
      an electronic book that is a companion to the audio book; and
   a computing device in communication with the electronic data store, the computing device configured to at least:
      during playback of the audio book, receive a user selection indicating a request to scan the audio book, wherein the request to scan the audio book is associated with a scan rate;
      based at least in part on the request to scan the audio book, update a current progress position in the audio book;

define a content window within the audio book that includes at least a portion of the audio book near the updated current progress position in the audio book, wherein a size of the content window is determined based at least in part on the scan rate;

determine one or more characteristic words associated with the content window, wherein the one or more characteristic words are determined based at least in part by comparing, for each of a plurality of words in a portion of the electronic book corresponding to the portion of the audio book included in the content window, a frequency of the word in the portion of the electronic book corresponding to said portion of the audio book with a frequency of the word in the electronic book as a whole; and for each of the determined one or more characteristic words associated with the content window:
determine a portion of audio content of the audio book in which the characteristic word is spoken; and
cause aural presentation of the portion of the audio content of the audio book in which the characteristic word is spoken.

2. The system of claim 1, wherein the computing device is further configured to at least:
continuously adjust the content window in increments based at least in part on the scan rate; and
continuously present portions of the audio content corresponding to characteristic words associated with the continuously adjusted content window.

3. A system for presenting audio content, the system comprising:
an electronic data store configured to store an item of audio content and text content representing words spoken in the audio content; and
a computing device in communication with the electronic data store, the computing device configured to at least:
receive a request to scan the audio content, wherein the request is associated with a scan rate indicating a rate at which to adjust a current position in the audio content;
based at least in part on a determination that the scan rate exceeds a predetermined threshold rate:
define a content window within the text content, wherein the content window includes text content representing words spoken near the current position in the audio content;
determine one or more characteristic words associated with the content window, wherein the one or more characteristic words are determined based at least in part on a number of times that each of a plurality of words appears in the text content included in the content window;
for each of the determined one or more characteristic words associated with the content window:
determine a portion of the audio content in which the characteristic word is spoken; and
cause aural presentation of the portion of the audio content in which the characteristic word is spoken.

4. The system of claim 3, wherein the computing device is further configured to at least slice audio data for at least two non-adjoining words in the audio content.

5. The system of claim 3, wherein the one or more characteristic words are determined based at least in part on a number of times that each of a plurality of words appearing in the content window appear in at least a subset of the audio content that includes audio content outside of the content window.

6. The system of claim 3, wherein the audio content comprises recorded narration audio data.

7. The system of claim 3, wherein the audio content is generated from the corresponding text content.

8. The system of claim 3, wherein the content window is defined to include a number of words determined based at least in part on the scan rate.

9. The system of claim 3, wherein the content window is defined to include text content representing words spoken during a time length of audio content, wherein the time length is based at least in part on the scan rate.

10. The system of claim 3, wherein the request to scan the audio content comprises a request to adjust the current position in the audio content forward or backward at a rate corresponding to the scan rate.

11. A computer-implemented method comprising:
as implemented by one or more computing devices configured with specific executable instructions,
receiving a request to scan audio content at a scan rate exceeding a normal playback rate;
in response to the request, updating a current position marker in the audio content based at least in part on the scan rate; and
based at least in part on the updated current position of the current position marker:
defining a content window within the audio content, wherein the content window includes at least a portion of the audio content near the current position, wherein a size of the content window is based at least in part on the scan rate;
determining one or more characteristic words associated with the content window, wherein the one or more characteristic words comprise one or more words spoken in the audio content within the content window, wherein the one or more characteristic words are determined based at least in part on text data representing words spoken in the audio content within the content window and word frequency data associated with each of a plurality of the words represented by the text data;
determining a portion of the audio content in which at least one of the one or more characteristic words is spoken; and
causing aural presentation of the portion of the audio content in which the at least one of the one or more characteristic words is spoken.

12. The computer-implemented method of claim 11, further comprising:
repeatedly updating the current position of the current position marker; and
causing a continuous presentation of characteristic words determined based at least in part on audio content near the repeatedly updated current position.

13. The computer-implemented method of claim 11, wherein the word frequency data includes data regarding frequency of each of a plurality of words in the audio content as a whole.

14. The computer-implemented method of claim 11, wherein the word frequency data includes data regarding how frequently each of a plurality of words is used in common language usage.

15. The computer-implemented method of claim 11, wherein the one or more characteristic words are determined based at least in part by analyzing the audio content, wherein the analysis of the audio content includes analyzing at least one of volume, tone or pitch.

16. The computer-implemented method of claim 11, wherein the one or more characteristic words are determined based at least in part on previous user actions, wherein the previous user actions include at least one of a bookmark or a note associated with one or more words within the content window.

17. The computer-implemented method of claim 11, wherein the request to scan the audio content comprises a fast-forward request or a rewind request.

18. The computer-implemented method of claim 11, wherein the request to scan the audio content is received based at least in part on an interface element representing the current position marker being dragged within a displayed interface.

19. A computer readable, non-transitory storage medium storing computer executable instructions that, when executed by one or more computing devices, configure the one or more computing devices to perform operations comprising:
- receiving a user selection indicating a request to scan audio content, wherein the request is associated with a scan rate indicating a rate at which to adjust a current position in the audio content;
- defining a content window within the audio content, wherein the content window includes a portion of the audio content between the current position and an ending position, wherein the ending position is selected based at least in part on the scan rate;
- determining one or more characteristic words associated with the content window, wherein the one or more characteristic words are selected from among a plurality of words spoken in the audio content within the content window, wherein the one or more characteristic words are selected based at least in part on text data representing words spoken in the audio content within the content window and word frequency data;
- determining a portion of the audio content in which at least one of the one or more characteristic words is spoken; and
- causing aural presentation of the portion of the audio content in which the at least one of the one or more characteristic words is spoken.

20. The computer readable, non-transitory storage medium of claim 19, wherein causing the aural presentation includes determining a playback volume for each of the one or more characteristic words based at least in part on the word frequency data.

21. The computer readable, non-transitory storage medium of claim 19, wherein causing the aural presentation includes splicing audio data for at least two non-adjoining words in the audio content.

22. The computer readable, non-transitory storage medium of claim 19, wherein at least two portions of the audio content corresponding to different characteristic words overlap in the aural presentation.

23. The computer readable, non-transitory storage medium of claim 19, wherein the operations further comprise:
- continuously adjusting the content window based at least in part on the scan rate; and
- causing continuous presentation of portions of the audio content corresponding to characteristic words associated with the continuously adjusted content window.

* * * * *